United States Patent [19]

Kettinger et al.

[11] 4,150,100

[45] Apr. 17, 1979

[54] PREPARING ZEOLITE NAA

[75] Inventors: Frederick R. Kettinger, Norristown; James A. Laudone, Easton; Richard H. Pierce, Broomall, all of Pa.

[73] Assignee: PQ Corporation, Valley Forge, Pa.

[21] Appl. No.: 915,327

[22] Filed: Jun. 13, 1978

[51] Int. Cl.$^2$ ............................................. C01B 33/28
[52] U.S. Cl. .................................... 423/329; 423/328
[58] Field of Search ................................ 423/328–330; 252/455 Z

[56] References Cited

U.S. PATENT DOCUMENTS

| | | | |
|---|---|---|---|
| 2,882,243 | 4/1959 | Milton | 423/328 |
| 2,904,607 | 9/1959 | Mattox et al. | 423/328 X |
| 2,958,579 | 11/1960 | McCormick et al. | 423/328 |
| 3,055,841 | 9/1962 | Gladrow et al. | 252/455 Z |
| 3,058,805 | 10/1962 | Weber | 423/329 |
| 3,425,800 | 2/1969 | Hirsh | 423/329 |
| 4,041,135 | 9/1977 | Williams et al. | 423/329 |
| 4,071,377 | 1/1978 | Schwuger et al. | 423/329 X |
| 4,073,867 | 2/1978 | Roebke et al. | 423/329 |

FOREIGN PATENT DOCUMENTS 1232429 5/1971 United Kingdom ..................... 423/328

*Primary Examiner*—Edward J. Meros
*Attorney, Agent, or Firm*—Ernest G. Posner; Fred C. Philpitt; J. S. Stephen Bobb

[57] ABSTRACT

Zeolite NaA can be produced with a very short crystallization time, if an alumino-silicate gel of particular properties is prepared and heated at about 95° C. The gel which is prepared by combining solutions of sodium aluminate and sodium silicate must contain a limited amount of water, be of a single phase and having a high viscosity. Gels of this nature can be heated for a fraction of an hour to yield essentially completely crystallized Zeolite NaA with no crystalline impurities.

9 Claims, No Drawings

PREPARING ZEOLITE NAA

BACKGROUND OF THE INVENTION

This invention relates to synthetic zeolites and their preparation and provides an improved method of preparing Zeolite NaA.

Naturally occurring or synthetic crystalline metallic alumino silicate known as zeolites have long been recognized as chemically active materials used for ion exchange or as adsorbants. The general compositional formula for a zeolite is:

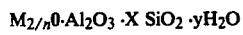

$$M_{2/n}O \cdot Al_2O_3 \cdot X\, SiO_2 \cdot yH_2O$$

For various types of zeolites, x and y are integers, while n is the valence of the metal, $\mu$. The chemical composition, structure, physical and chemical properties of zeolites have been disclosed and discussed in numerous articles and texts. These sources include: D. W. Breck's book, *Zeolite Molecular Sieves; Structure, Chemistry and Use*, Wiley-Interscience; 1974. This text is hereby incorporated in this application as descriptive of the subject matter of this application and a general summation of the state of the art.

U.S. Pat. Nos. 2,882,243–4; 3,012,853 and 2,958,579 are typical of the patents teaching the preparation of zeolites. These crystalline materials are most commonly prepared by combining sources of silica, alumina and alkali, thereby forming an aqueous alumino-silicate gel. This gel is then crystallized at elevated temperatures.

The hydrothermal crystallization step required to produce zeolites has required treatment at elevated temperatures for a substantial period of time. U.S. Pat. No. 4,041,135 is typical and indicates that the crystallization step requires 1 to 6 hours. Seeding has been suggested to reduce the crystallization time. But, processes that require seeding still have crystallization steps of an hour or more. British Patent No. 1,232,429 presents some data on the reaction time but does not disclose effective methods by which the crystallization time may be reduced.

It is believed that the references indicated hereinbefore, are the most relevant to the present invention and that they provide a current picture of the state of the art of preparing zeolites.

It is an object of this invention to provide a method of preparing Zeolite NaA in which the time required for crystallization is a small fraction of the time required in the prior art practice.

SUMMARY OF THE INVENTION

Zeolite NaA can be produced in less than one-half the time required by prior art processes. This process advantage is realized by producing a gel of certain well defined properties that can be crystallized by hydrothermal treatment in a fraction of the usual crystallization time. The gel is prepared by combining sources of alkali metal, silica and alumina and must have a very low water content, be of a single phase and be highly viscous. A gel prepared from sodium aluminate and sodium silicate and having the required properties can be crystallized in less than 20 minutes at a temperature approximating 95° C. The resulting product is essentially pure Zeolite NaA with essentially no crystalline or other impurities.

THE DETAILED INVENTION

Sources of alumina, silica and alkali are the required raw materials for the process of our invention. Sodium aluminate and sodium silicate are preferred raw materials.

The sodium aluminate ($NaAlO_2$) is used as a solution and is prepared by dissolving alumina trihydrate in sodium hydroxide. A solution containing about 40% solids can be prepared by slowly adding alumina trihydrate to agitating NaOH at 100° C. This material is diluted for use.

The sodium silicate is also used as a solution and can be prepared in a number of ways which are well known. Commercially available silicates can be used as is or can be adjusted in composition by addition of water and/or caustic.

The compositions and concentrations of these raw materials are adjusted so that about equivalent volumes (each component supplies 50 ± 20% of the volume of the gel) can be combined to form a gel having a molar composition of about 1.00 ± 0.02 $Al_2O_3$:1.80 ± 0.20 $SiO_2$:2.90 ± 0.90 $Na_2O$:45.0 ± 15.0 $H_2O$. The gel is prepared by adjusting the temperature of the reactants to temperatures such that upon mixing, the resulting gel has a temperature of 65 ± 5° C. and preferably 65 ± 2° C. In most cases, both raw materials would be at 65 ± 2° C., but in some cases, handling considerations because of viscosities could require the raw materials to be at different temperatures. The sodium aluminate at the required temperature is placed in an agitated reaction vessel. Then, the sodium silicate is added in such a manner that a single phase highly viscous gel is formed. The temperature of this gel is raised as quickly as possible from about 65° C. to about 95° C. After 5 to 20 minutes at the elevated temperature, crystallization is essentially complete. Then, the temperature is quickly reduced to prevent further undesirable crystalline transformations. The crystallized material is separated, washed and dried by conventional methods to provide the product in the desired form.

The short time required for crystallization of Zeolite NaA in our process provides considerable advantage over the prior art and present commercial practice. This advantage can be realized only if an alumino-silicate gel of certain well defined characteristics is prepared and crystallized. The gel must be of a single phase with a viscosity of more than 2,000 cps. We prefer the viscosity to between 5,000 and 13,000 cps. The solids and structurally associated water which we call "centrifuged solids," must comprise 80 to 90% of the total volume of the gel. This value is determined by centrifuging the gel at 1750 RPM for 3 minutes and determining the volume of the settled material ("centrifuged solids") and comparing it to the original volume of the gel. In addition, these gels have a specific gravity of 1.23 to 1.29 and a pH value between 12.4 and 13.0. Gels that do not exhibit these characteristics such as those with 2 phases with "centrifuged solids" volumes of 24 to 60% cannot be crystallized to form zeolite NaA in the desirably short time characteristic of the process of our invention.

The critical nature of the gel required in our process dictates that the variables associated with gel preparation be carefully controlled. These variables include controlling the composition and concentration of the raw materials, the proportions in which they are combined, the temperature at which the alumino-silicate gel is formed, the rate at which the silicate is added to the aluminate and the shear developed during mixing.

The preparation of single phase, viscous gels is facilitated if the compositions and the concentrations of the silicate and the aluminate are controlled so that about equivalent volumes of the raw materials provide the desired gel. When 50 ± 20% of the gel volume is provided by each component, a suitable gel with the molar ratio of about $1.00 \pm 0.02$ $Al_2O_3$:$1.80 \pm 0.20$ $SiO_2$:$2.90 \pm 6.90$ $Na_2O$:$45.0 \pm 15.0$ $H_2O$ can be prepared. We prefer to provide raw materials that provide about 50 ± 10% of the gel volume. We most prefer to use raw materials than can be combined on a 1:1 basis.

The silicate solution must be added to and combined with the aluminate very rapidly. It should be added and combined in less than about 2 minutes. A minimum time of about three-quarter of a minute is imposed by equipment restraints. This time of addition requires that the silicate be added to the aluminate at the rate of 40 ± 10% of the volume of the total gel per minute. The temperature of the gel produced must be about 65 ± 2° C. If either or both of these variables is not controlled as described, then a 2 phase gel is produced which has less than 65% "centrifuged solids." Such a gel does not crystallize quickly; attaining only about 30% crystallization in the desired time.

The rapid addition of the silicate requires attention to the manner of mixing to prevent irreversible localized gels of inhomogeneous compositions. The silicate must be completely dispersed immediately upon contact with the aluminate. The mixing device must apply sufficient shear to reduce an immobile gel which forms within 20 seconds of the initial addition to a fluid gel. This action must be accomplished within 5 seconds of the formation of such a gel. We have found that these requirements can be met by a stirring device that provides injection of the silicate through the stirring blades. After addition of the silicate solution, the gel is mixed for a period sufficient to provide a gel of the required viscosity, usually 7 to 25 minutes is required. High shear mixing cannot be relied upon to produce an acceptable gel if other required conditions of gel preparation are not met.

The viscous gel which is at a temperature of about 65° C. is immediately passed through a heat exchanger to raise the temperature of the gel to about 95° C. This increase in temperature is accomplished as quickly as possible (usually a matter of minutes) so that crystallization is initiated uniformly. Crystallization is essentially completed in 5 to 20 minutes by maintaining the temperature at 95 ± 5° C. and preferably 95 ± 2° C. In the process of our invention, the water content appears to be the most important influence on the reaction time. As long as a single phase, viscous gel is employed, the crystallization time is proportional to the water content of the gel and can be approximated by the following empirical equation:

Crystallization time (minutes at 95°C.) = 0.002369 (mole ratio $H_2O/Al_2O_3$)$^{2.1}$ Seeding the viscous gel of our process does not appear to reduce the crystallization time as we have found that crystallization times of about 9 to 18 minutes are realized whether gels containing 50 moles of water per mole of $Al_2O_3$ are seeded or not. Seeding does appear to increase the size of the Zeolite NaA crystals realized from our process.

The process of our invention can be modified to produce either agglomerated or non-agglomerated Zeolite NaA crystals. If the crystallization is carried out statically or under mild agitation, agglomerated crystals result from the high solids density of the gel and the fast reaction rate. If the crystallization is carried out at high shear, the crystals are not agglomerated.

Conventional filtering, washing and drying steps complete the processing of the zeolite. The product of our process is essentially pure Zeolite A with a molar composition of 1.0 $Na_2O$:1.0 $Al_2O_3$:2.0 $SiO_2$. The moisture content is 18 to 25%. The average particle size is 4 to 6 microns with more than 95% by weight of the particles smaller than 10 microns. The ion exchange capacity is high with the capability of exchanging more than 175 mg. of $CaCO_3$ or its equivalent per gram per minute. X-ray analysis indicates more than 90% crystallinity. The product of our process is useful in applications known for Zeolite NaA, particularly as an ecologically acceptable builder for detergents.

EXAMPLES

The following examples illustrate certain embodiments of the process of our invention and should not be considered as limiting to the scope of the invention which is fully recited in the specification and the claims. Certain examples of prior art practice are also included for comparative purposes. The proportions are in part-by-weight (pbw) or percent-byweight (%) unless otherwise indicated. The ratios are molar unless otherwise indicated.

EXAMPLE 1

This example illustrates the preparation of Zeolite NaA according to the process of our invention and can be considered representative of the best mode of carrying out the invention.

A sodium aluminate solution was prepared by heating 190 pbw of 50% caustic solution and 114.6 pbw of deionized water to 100° C, then 157 pbw of alumina hydrate containing 65.3% $Al_2O_3$ was added slowly with agitation until dissolved. This concentrated material was diluted with 257.4 pbw of deionized water before use. The solution used had 10.7% $Na_2O$ 14.6% $Al_2O_3$ with a mole ratio of 1.0 $Al_2O_3$:1.2 $Na_2O$: 28.0 $H_2O$.

A commercial sodium silicate solution with a 2.4 $SiO_2/Na_2O$ weight ratio and containing 13.85% $Na_2O$ and 33.24% $SiO_2$ was treated to obtain a dilute silicate of more alkaline character as follows. The silicate (325 pbw) was combined with 60 pbw of 50% caustic and 194/pbw of deionized water to provide a solution that contained 19.0% $SiO_2$ and 11.9% $Na_2O$ with a mole ratio of 1.8 $SiO_2$:1.1 $Na_2O$:22.0 $H_2O$. The volumes of the aluminate and silicate solutions were equal.

The temperatures of the raw materials were adjusted to 65 ± 2° C. before reacting. The aluminated solution was placed in an insulated, heated reaction vessel so that the temperature of 65° C. is maintained during gel preparation. The reaction vessel was equipped with a Denver Air Flotation Mixing or Blending Unit capable of high shear mixing and injecting the silicate solution into the aluminate with complete dispersion of the silicate. The sodium silicate is pumped into a port at the top of the mixing shaft and drawn downward through a disperser and out into the aluminate. The mixing speed was 1600 RPM. The silicate was added at the rate of 37% of the gel volume per minute and the addition required about 1.35 minutes. Within the first 20 seconds of silicate solution the viscosity of the reaction mixture increased and a solid immobile mass of gel was formed. This gel persisted for 5 seconds after which a more fluid intermediate was observed during the remainder of the silicate addition. After addition of the silicate was completed, stirring was continued for 10 minutes.

A sample of the resulting gel was taken and found to have a specific gravity of 1.26, a pH of 12.7 and a viscosity of 8,270 cps at 65° C. The white gel was of a single phase and had a "centrifuged solids" of 87% of the volume of the gel after centrifuging at 1750 RPM for 3 minutes.

The gel was pumped through an inline high shear homogenizer and a heat exchanger. The gel was heated to 97° C. and transferred to a crystallization vessel. Transfer and heating of the gel required 3 minutes. The gel was maintained at 95 ± 2° C. for 10 minutes, while being subjected to high shear. Then the gel mixture was quenched to room temperature using a heat exchanger to prevent additional crystalline transformations. The mother liquor was removed on a rotary vacuum filter using deionized water for washing. The Zeolite A was reslurried and spray dried under conditions that provided a product with a loss on ignition of 17.77%. The product had a mole ratio of 1.00 $Na_2O$:1.08 $Al_2O_3$:1.98 $SiO_2$. The mean particle size was 4.3 $\mu$ while only 2.4% of the particles were larger than 10 $\mu$. The ion exchange capacity was determined as 177 mg. of $CaCO_3$/gm zeolite minute. The zeolite was white and free flowing and X-ray diffraction showed a crystallinity of 90%.

EXAMPLE 2

The process described in example 1 was repeated except that the crystallization step was executed without high shear mixing. Mild agitation was used to facilitate heat exchange. The product had a LOI of 18.02%, a mole ratio of 1.00 $Na_2O$:0.97 $Al_2O_3$:1.02 $SiO_2$. The mean particle size was 5.0 and 16.3% of the particles were larger than 10 $\mu$. The example demonstrates that agglomerated zeolite particles are easily formed by the method of our invention.

EXAMPLE 3

This example illustrates preparation of a 2 phase gel and that such a gel cannot be crystallized in a short time. The process was carried out as described in example 1 except that the sodium aluminate solution was adjusted to 53° C. and the sodium silicate was adjusted to 43° C. prior to combining the solutions. The resulting gel temperature was 50° C. and this temperature was maintained for the 10 minutes shear that was applied after addition of the silicate. A sample of this gel was taken and found to be of 2 phases. The specific gravity was 1.26, the viscosity was 92 cps and the "centrifuged solids" was 60% by volume.

The gel was crystallized under the conditions described in example 1. After 10 minutes, the material was found to be only 30% crystalline Zeolite A with a detectable amount of hydroxysodalite.

EXAMPLE 4

This example illustrates a preparation that can properly be described to the prior art in that the amount of water in the gel is not controlled, with the result that about 1 hour is required for crystallization which approximates the best prior art crystallization time. The process of Example 1 was followed except that the silicate and aluminate solutions were diluted so that the resulting gel contained 125 moles of water per mole of $Al_2O_3$. High shear agitation was not required to produce a uniform white gel when the silicate was added to the aluminate. The gel had a viscosity below 500 cps and a "centrifuged solids" volume of 45% after centrifuging for 3 minutes at 1750 RPM. The gel was raised to 97° C. and agitated during crystallization at 95 ± 2° C. After 10 minutes X-ray showed that only about 25% of the material was crystallized. After 65 minutes, 95% of the material was crystallized and found to be Zeolite NaA.

We claim:
1. The process of preparing Zeolite NaA by thermal treatment of a hydrated alumino-silicate gel characterized by a low water content, high viscosity and high "centrifuged solids" content, comprising the steps of:
   (a) providing sodium aluminate and sodium silicate solutions at such concentrations and compositions that upon combining about equivalent volumes of said solutions an alumino silicate gel having a molar ratio of about 1.00 ± 0.02 $Al_2O_3$:1.80 ± 0.20 $SiO_2$:2.90 ± 0.90 $Na_2O$:45.0 ± 15.0 $H_2O$ is formed, the temperatures of said aluminate and silicate solutions being adjusted to provide a gel with a temperature of 65 ± 2° C., when combined;
   (b) placing a volume of said sodium aluminate solution in a reaction vessel equipped with a high shear stirring device;
   (c) adding said sodium silicate solution to the reaction vessel in less than 2 minutes, thereby forming an alumino-silicate gel, the volume of said silicate solution being about equivalent to the volume of the aluminate solution;
   (d) subjecting the combining aluminate and silicate solutions and the resulting gel to intensive mixing during addition of the silicate and for a period of 7 to 25 minutes thereafter, said mixing providing sufficient shear to reduce an immobile gel which forms within 20 seconds of the initial silicate addition to a fluid gel within 5 seconds, thereby providing an alumino-silicate gel having a single phase, a specific gravity of 1.23 to 1.29, a viscosity in excess of 2,000 cps and a "centrifuged solids" volume of 80 to 90%;
   (e) heating said alumino-silicate gel to about 97° C.,
   (f) maintaining the temperature of said gel at about 95 ± 2° C. for a period of time approximated by the equation: Crystallization time (min. at 95° C.) = 0.002369 (molar ratio $H_2O/Al_2O_3$)$^{2.1}$, thereby forming Zeolite NaA as a slurry;
   (g) cooling the slurry of Zeolite NaA; and
   (h) separating, washing and drying to obtain the Zeolite NaA product.

2. The process of claim 1 wherein the aluminate and silicate provide 50 ± 20% of the volume of the gel formed.

3. The process of claim 1 wherein the aluminate and silicate provide 50 ± 10% of the volume of the gel formed.

4. The process of claim 1 wherein the aluminate and silicate each provide 50% of the volume of the gel formed and said aluminate and silicate solutions are at a temperature of 65 ± 2° C. when mixed.

5. The process of claims 1, 2, 3 or 4, wherein the silicate solution is added at the rate of 40 ± 10% of the total volume of the gel per minute.

6. The process of any of claims 1, 2, 3 or 4 wherein the crystallization time is 5 to 20 minutes.

7. The process of claim 1 wherein the crystallization step (f) is carried out under mild agitation resulting in agglomerated Zeolite NaA.

8. The process of claim 1 wherein the crystallization step (f) is carried out under sufficient shear to prevent agglomeration of the Zeolite NaA.

9. The process of any of claims 1, 2, 3 or 4 wherein the silicate solution is injected into the aluminate solution through the high shear mixing device.

* * * * *